March 30, 1937. R. S. KELLEY 2,075,763
SEPARABLE INTERLOCKING FASTENER AND METHOD OF MAKING SAME
Original Filed July 10, 1933
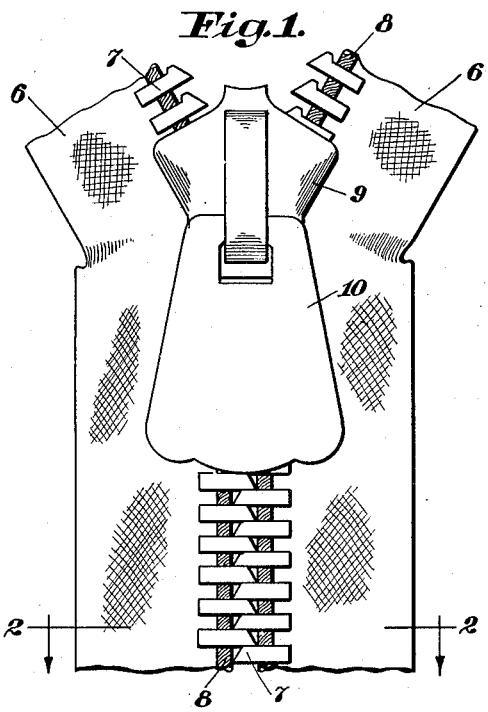
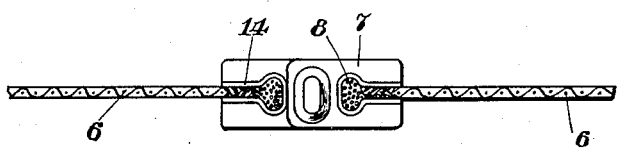
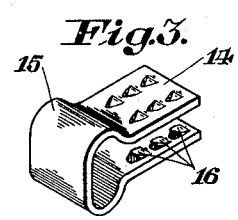
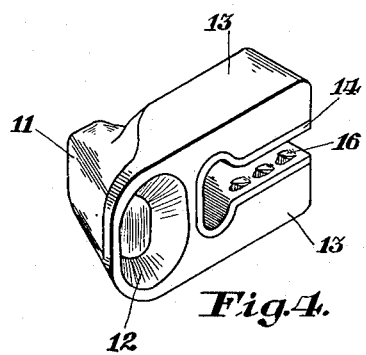
INVENTOR.
Roland S. Kelley
BY Kelley + Chisholm.
ATTORNEYS.

Patented Mar. 30, 1937

2,075,763

UNITED STATES PATENT OFFICE 2,075,763

SEPARABLE INTERLOCKING FASTENER AND METHOD OF MAKING SAME

Roland S. Kelley, Meadville, Pa., assignor to Hookless Fastener Company, a corporation of Pennsylvania Application July 10, 1933, Serial No. 679,687
Renewed July 14, 1936

5 Claims. (Cl. 24—205)

This invention relates to separable interlocking fasteners and is particularly concerned with the problem of attaching the individual fastener members to the edges of flexible supports. These fastener members must be attached firmly so that they will not slip on the support and must be positioned accurately on the edge of the support in order that the fastener members on opposite sides will intermesh and interlock.

In making such fastener of metal the fastener members are formed with a pair of gripping jaws which are bent around the beaded edge of fabric tapes. This method of attaching is not feasible, however, when the fastener members are made from non-metallic materials such as pyralin or bakelite because such materials have very little gripping strength and are difficult to bend accurately.

It is the principal object of my invention to provide an improved fastener of the above type having non-metallic fastener members held in place on flexible supports by simple and effective attaching means.

In the drawing:

Fig. 1 is a general view of a completed fastener with the ends broken away;

Fig. 2 is a cross-section through the fastener on line 2—2 of Fig. 1;

Fig. 3 is a perspective view of one form of attaching means; and

Fig. 4 is a perspective view of a non-metallic fastener member assembly with metallic attaching liner.

The fastener illustrated comprises generally a pair of flexible supports such as tapes 6, having fastener members 7 attached in uniformly and closely spaced relation along the beaded edges 8. The fastener members are brought into interlocked relation or disengaged by means of a slider 9 actuated by a pull tab 10. Each of the fastener members has a projection 11 on one side and a recess 12 on the opposite side and when the fastener is closed, a projection on one member will engage in a recess in the opposite member. The shape of the interlocking portion may be varied widely and the particular form illustrated does not constitute a part of this invention.

Each fastener member is provided with a pair of parallel attaching portions 13. The means for holding the fastener member in position on the tape herein comprises a metal attaching member in the form of a liner 14 mounted between the attaching portions 13. This liner 14 is preferably made so as to fit tightly between the gripping portions and be held in place in the fastener member by friction. As illustrated, the liner 14 has an enlarged cylindrical portion 15 at its inner end and is provided with barbs or prongs 16 extending inwardly toward each other at the opposite end. When the fastener member and liner assembly are pushed over the edge of a tape, the barbs 16 will dig into the fabric of the tape and hold the assembly firmly in position. With the enlarged cylindrical portion a more positive interlock is provided between the liner and the fastener member and also a more positive connection to the beaded edge of the tape. The size of the cylindrical portion and beaded edge is somewhat exaggerated in the drawing and it will be understood that the size of the beaded edge is only sufficient so that it can be compressed to enter between the sides of the liner 14.

While I have shown and described in this application one embodiment which my invention may assume in practice, it will be understood that this embodiment is merely for the purpose of illustration and description and that various other forms may be devised within the scope of my invention as defined in the appended claims.

What I claim as my invention is:

1. A separable interlocking fastener of the class described including a flexible tape, a series of non-metallic fastener members in uniformly and closely spaced relation along the edge of said tape, and metallic attaching members secured to the non-metallic fastener members and disposed between said non-metallic fastener members and tape, said metallic members having prongs engaging in said tape.

2. A separable interlocking fastener of the class described including a flexible tape, a series of non-metallic fastener members arranged in uniformly and closely spaced relation along the edge of said tape, each of said members including an interlocking portion and attaching arms, a metal liner fixed between said arms and having anchor means engaged in and penetrating said tape.

3. A separable interlocking fastener member comprising a non-metallic body having interlocking means at one end, attaching arms at the other end, and a metallic liner wedged between said arms, said liner having means adapted automatically to penetrate a flexible support when the latter is inserted therein.

4. A separable interlocking fastener of the class described including a flexible tape, a series of non-metallic fastener members in uniformly and closely spaced relation along the edge of said tape, each of said members having arms embracing said tape, and an intermediate metallic liner between said arms having prongs penetrating into said fabric to hold said fastener member in place.

5. The method of making separable interlocking fasteners of the class described comprising forming fastener members of rigid plastic material, said fastener members having interlocking heads at one end and a slot at the other end, forming a metal liner of approximately U-shape to fit in said slot, inserting said metal liner in said slot and inserting the edge of a fabric tape between the sides of said metal liner, and causing the same to interlock therewith.

ROLAND S. KELLEY.